United States Patent
Benavides Perez et al.

(10) Patent No.: US 11,154,063 B2
(45) Date of Patent: Oct. 26, 2021

(54) METHOD FOR PRODUCING A BACTERIOSTATIC AND FUNGISTATIC ADDITIVE IN MASTERBATCH FOR APPLICATION IN PLASTICS

(71) Applicant: SERVICIOS ADMINISTRATIVOS PEÑOLES, S.A. DE C.V., Coahuila (MX)

(72) Inventors: Ricardo Benavides Perez, Coahuila (MX); Jose Gertrudis Bocanegra Rojas, Coahuila (MX); Carlos Sergio Tena Salcido, Coahuila (MX)

(73) Assignee: SERVICIOS ADMINISTRATIVOS PEÑOLES, S.A. DE C.V., Coahuila (MX)

( * ) Notice: Subject to any disclaimer, the term of this patent is extended or adjusted under 35 U.S.C. 154(b) by 0 days.

(21) Appl. No.: 15/909,374

(22) Filed: Mar. 1, 2018

(65) Prior Publication Data
US 2018/0249715 A1 Sep. 6, 2018

Related U.S. Application Data

(62) Division of application No. 14/911,214, filed as application No. PCT/MX2013/000077 on Jun. 25, 2013, now abandoned.

(51) Int. Cl.
*A01N 59/16* (2006.01)
*A01N 59/20* (2006.01)
(Continued)

(52) U.S. Cl.
CPC ............. *A01N 59/16* (2013.01); *A01N 25/10* (2013.01); *A01N 59/20* (2013.01); *B82Y 30/00* (2013.01)

(58) Field of Classification Search
None
See application file for complete search history.

(56) References Cited

U.S. PATENT DOCUMENTS 5,180,585 A * 1/1993 Jacobson ............... A01N 25/26
424/404
8,546,484 B2 * 10/2013 Higuchi ................. C08J 7/0427
524/858
(Continued)

FOREIGN PATENT DOCUMENTS

WO WO-2009061165 A1 * 5/2009 ............. B82Y 30/00
WO WO 2010053232 A1 * 5/2010 ............. A45D 31/00

OTHER PUBLICATIONS

Mallakpour et al. Use of silane coupling agent for surface modification of zinc oxide as inorganic filler and preparation of poly(amide-imide)/zinc oxide nanocomposite containing phenylalanine moieties. Bull. Mater. Sci., vol. 35, No. 3, Jun. 2012, pp. 333-339. c Indian Academy of Sciences.*

(Continued)

*Primary Examiner* — Lakshmi S Channavajjala
(74) *Attorney, Agent, or Firm* — Shumaker, Loop & Kendrick, LLP

(57) ABSTRACT

A method for production of an additive case having the steps of preparing a zinc oxide concentration from a paste of nanometric zinc oxide that was previously subjected to surface treatment based on silane additives, preparing a silver concentrate starting from a silver paste of nanometric metallic silver, and preparing the additive paste by mixing the zinc oxide concentrate and the silver concentrate and a polymeric carrier with a compatible resin. The polymeric carrier and compatible resin are in a proportion of between 10:90 to 90:10. The steps obtains the additive paste of ZnO/AG° in masterbatch in pellet form.

3 Claims, 6 Drawing Sheets

(51) Int. Cl.
*A01N 25/10* (2006.01)
*B82Y 30/00* (2011.01)

(56) References Cited

U.S. PATENT DOCUMENTS

| | | | | |
|---|---|---|---|---|
| 8,796,364 | B2* | 8/2014 | Benavides Perez ... | B82Y 30/00 |
| | | | | 524/88 |
| 2007/0151038 | A1* | 7/2007 | Lai ........................ | D06M 11/44 |
| | | | | 8/115.51 |
| 2008/0242794 | A1* | 10/2008 | Sandford ............... | A01N 59/16 |
| | | | | 524/515 |
| 2010/0092531 | A1* | 4/2010 | Odermatt ................ | A61L 27/18 |
| | | | | 424/409 |

OTHER PUBLICATIONS

Emamifar et al. Evaluation of nanocomposite packaging containing Ag and ZnO on shelf life of fresh orange juice. (Innovative Food Science and Emerging Technologies 11 (2010) 742-748. (Year: 2010).*

Sharma et al. Antibacterial study of silver doped zinc oxide nanoparticles against *Staphylococcus aureus* and Bacillus subtilis. Drug Invention today, Mar. 2013, vol. 5(1), p. 50-54. (Year: 2013).*

* cited by examiner

METHOD FOR PRODUCING A BACTERIOSTATIC AND FUNGISTATIC ADDITIVE IN MASTERBATCH FOR APPLICATION IN PLASTICS

CROSS-REFERENCE TO RELATED APPLICATIONS

The present application is a divisional application of U.S. patent application Ser. No. 14/911,214, filed on Feb. 9, 2016, and entitled "Bacteriostatic and Fungistatic Additive in Masterbatch for Application in Plastics, and Method for Producing Same", presently pending.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

This invention refers to additives used in the plastics industry, particularly refers to an additive concentrate in the form of masterbatch with bacteriostatic and fungistatic activity manufactured by mixing a concentrate of nanoparticles of zinc oxide and a concentrate of metallic silver nanoparticles and a method for its manufactures.

2. Description of Related Art Including Information Disclosed Under 37 CFR 1.97 and 37 CFR 1.98

People have been concerned for a long time to protect themselves from germs that can cause disease, infections and growth of bacteria and moulds. The manufacture of articles with antimicrobial additives helps to increase the protection against these microbes. Many products containing antimicrobial additives exist, including soaps, lotions and disinfectants and environment refreshing products. These products are used to clean surfaces that may have germs on them, which offers some protection benefits but do not prevent microbes to settle back. In the field of health care, medical devices and dental instruments as well as several surgical implants are manufactured with antimicrobial additives. These devices are in themselves impermeable to germs, but to thoroughly protect a surface, it should be possible to replace the entire surface with a new surface including antimicrobial additives.

In the literature have been described polymeric articles with antimicrobial properties. Such articles are made in various shapes and dimensions, such as granules, films, fibers, containers, pipes, structural components, medical devices, etc. It is also known that certain metals such as silver, copper and zinc and its compounds are effective as antimicrobial agents. There have been many attempts to use this attribute in polymeric articles.

For example, in U.S. Pat. No. 5,180,585 (Jacobson et al., 1993) an antibacterial composition and a method for its manufacture are described, comprising an inorganic particle with a first coating that provides antimicrobial properties and a second coating which provides a protective function, for incorporation into polymeric materials with antimicrobial properties. In the same patent some historical references on use patterns are presented; thus in U.S. Pat. No. 4,906,466 (Edwards et al, 1990) an antimicrobial composition is described comprising a silver compound selected from AgCl, AgBr, Ag2CO3 and Ag3PO4, deposited on a physiologically inert particle, selected from oxides of Ti, Mg, Al, Is, Ce, Hf, Nb and Ta, calcium hydroxyapatite and barium sulfate. It is disclosed that the compositions may be modified by the inclusion of other ingredients such as dispersion aids, and these compositions may be incorporated into polymeric materials in an amount of 5-60% by weight of compound. The antimicrobial silver compound in contact with the polymeric article may interact with it producing undesirable effects, such as darkening due to reduction to metallic silver.

Several patents describe antimicrobial compositions in which zeolite particles as supports for antimicrobial metal ions are used. Zeolites are aluminosilicates, of either natural or synthetic origin, which have sites at which cationic exchange may occur. When treated with solutions of metal ions, an antimicrobial metal ion can be substituted in the zeolite structure. Polymeric articles having antimicrobial properties are made by incorporating the treated zeolites with the polymer or else, the zeolite can be mixed with the polymer and then treated with a solution of the desired antimicrobial metal ion. There are no barrier coatings on the particles to prevent interactions of the metal ions with the polymer to control the rate of release of the antimicrobial species or to facilitate dispersion of the particles into the polymer article. For example, the use of zeolite particles in polymer articles is described in detail in U.S. Pat. No. 4,775,585 (Hagiwarn et al., 1988), and more specifically, U.S. Pat. No. 4,525,410 (Hagiwara et al., 1985) is directed to applications in fibers. Furthermore, it is recognized that zeolite powders tend to agglomerate and are inferior in dispersibility when mixed with resins. U.S. Pat. No. 4,741,779 (Mita et al., 1988) discloses the addition of fine silica, dry or in sol form, to provide a zeolite powder having free flowability and low agglomerating properties. Such problems as aggregation and colour development in zeolite antimicrobial compositions also are addressed in other documents which relate to the use of additives such as fatty acid salts to aid in the dispersion of UV light absorbers to prevent color development.

U.S. Pat. No. 8,105,688 (Liu, 2012) meanwhile, describes a combined solid phase inorganic powder, a masterbatch, a method for manufacturing the same, and a method for manufacturing a fiber that includes, in percentage: 10-20% of the masterbatch and 8090% of a long chain polymer; the silver content in the fiber of the present invention reaching 3-10%, with a high kill rate, UV high blocking rate, is durable and safe efficiency and having no side or toxic effects.

Another alternative for providing antimicrobial properties to the surfaces of various articles is disclosed in U.S. Pat. No. 8,282,951 (Redler, 2012), in which protective surface coatings and a method are described for applying such a coating, for example, to the external surfaces of a building. In one of the embodiments of the invention, an antimicrobial coating which includes an inorganic antimicrobial additive, a colloidal polymer medium and water is described; the additive includes particles having a diameter of 2 to 3 microns which include one element of the group consisting of silver, platinum, gold, palladium, copper, zinc, boron and a compound of any of them. The colloidal polymer medium has a polymeric resins with a size similar to or smaller than the additive particles, preferably between 0.005 microns and less than 1 micron in diameter; the preferred polymer medium being a polyurethane, an acrylic or a polyester medium.

U.S. Pat. No. 6,544,536 (Krall et al., 2003) discloses processes for producing plastic bodies that can be processed further for medical uses, which exhibit an antimicrobial effective content of metal compounds of special type, from which an oligodynamic effect is known, such as silver, copper and gold, as well as heavy metals such as zinc and even lanthanides, which have, as intended in the invention, an effect on bacteria and fungi because they eliminate and prevent their multiplication and their adhesion or embedding in the plastic, or having at least a long lasting effect. The difficulty to find such materials commercially lies mainly in the high cost of the quantities of metal and/or metal compounds necessary to achieve the desired purpose, particularly in the case of silver, as these substances should be included in the plastic in powder form, in which case the lower limit of efficiency of metal/metal compound is often established set in the order of 1% by weight of the plastic, being used however higher amounts to make it more effective. Some examples of these applications are to be found in U.S. Pat. No. 4,054,139; WO-A-84/01721; EP-A-0190504 DE-A-: 37 25 728, EP-A-0251783 and DE-A-39 42 112. One way to avoid high costs is not to subject all the plastic to antimicrobial treatment, but simply to coat the finished objects by any of the conventional methods such as physical vapour deposition, cathodic spraying (sputtering), plasma assisted vapour deposition, chemical methods such as currentless electroplating, reactive vapour deposition, reactive cathodic spraying, CVD, PACVD, which work only on the surfaces exposed to the source of the active substance to be applied, or as in the case of plasma assisted methods, at least one surface being open to the atmosphere being covered. The problem is solved in this patent using a method in which plastic bodies having a content of one or more oligodynamically active metals are produced, as a substance that is embedded in the plastic in the form of discrete particles, wherein the amount of active substance is not greater than 1.0% by weight, preferably not more than 0.5% by weight based on the total weight of the plastic body, and the maximum particle size of the active substance is less than 500 nm.

Certain polymeric materials, for example polyvinyl chloride, are susceptible to biological attack, especially from fungi. In order to reduce or to avoid the degradation of plastics resulting from such biological attack, biocidal products have been developed for incorporation into plastics materials or paints to kill the responsible fungi or bacteria or to prevent their proliferation. It is also known to incorporate biocidal compounds into plastics to prevent the growth of bacteria or fungi to be found in food products. In U.S. Pat. No. 5,433,424 and Japanese JP-A-06287403 and JP-A-07 071 869 among others, examples are described of this latter type of product; and items such as surfaces for food preparation and household containers etc. are already widely available to consumers.

WO 96/29361 patent application describes a biocidal polymeric matrix formed by a support matrix, an antimicrobial agent and a carrier agent, wherein the carrier agent and the antimicrobial agent are adapted to form at least one hydrogen bond or salt bridge between them.

WO 96135205 patent application describes a white cover for piano keys formed by injection of a homogeneous dispersion of a methyl methacrylate resin and 0.5-2% of an antibacterial agent comprising a ceramic body prepared by sintering a mixture of phosphate calcium and metallic silver.

WO 98/21253 patent application describes polymers which have antimicrobial properties and copolymers of vinyl monomers with non-functional vinyl comonomers of specified composition with ionic functionality.

WO 96/22023 patent application describes the use of derivatives of 2-alkyl or 2-aralkyl benzisothiazolin-3-one as fungicides for plastic materials.

JP-A-08257493 patent application discloses the use of a steel plate having a layer of paint incorporating inorganic aggregates containing anti-bacterial compounds, as a lining for refrigerators, freezers or heating cabinets.

The JP-08145394 and JP-A08145392 patent applications describe the use of plastics incorporating anti-microbial compounds for use in ventilation apparatus.

EP-A-606 762 patent application discloses a composition of a styrene polymer, an antibacterial agent and a compound having a specific functional group to produce an antibacterial resin composition.

U.S. Pat. No. 4,533,435 patent application describes an antimicrobial paper for packaging surgical supplies which incorporates antibacterial compounds in a vinylic polymer binder.

The incorporation of antimicrobial agents is reviewed by D. Smock in Formulating and Compounding Plastics, March/April 1997 p. 16 and Plastics World March 1992 p. 58.

The invention disclosed by U.S. Pat. No. 6,632,855 patent application (Beverly et al, 2003) is directed towards improving the biocidal activity of acrylic materials containing known biocidal compounds. The selection of any particular biocide for articles of the invention is made according to the end use of the article and the properties of the product, for example its activity against certain types of microorganisms, toxicity, processability, etc. The biocide is preferably present in a concentration of at least 0.25% by weight, more preferably at least 1% by weight of the polymer, for example 0.5-3% by weight. The plastic material of the invention can have many applications. It is useful as a resin for molding or extrusion applications, for example to make doors or panels for interior or exterior applications etc. It can be supplied as a sheet material, for example, for providing walls, linings etc. or it may be suitable for forming into articles such as bathtubs for example by thermoforming. It may also be useful in the form of a primer, for example a polymethyl methacrylate resin dissolved in methyl methacrylate and optionally with a dispersion of fillers, colours and other functional particles for the manufacture of sinks, worktops, shower trays, etc. The plastic material of the invention may be especially useful as a coating on a substrate. One advantage of this form of the invention is that a relatively small amount of active biocide plastic can be used to confer a biocidal function to the surface of a non-biocidal substrate. Recommended biocidal compounds include triclosan, compounds based on heavy metals, especially silver, on inorganic carriers such as zeolites, hydroxyapatite, zinc oxide, titanium dioxide, zirconium phosphate, isothiazolones, derivates from benzisothiazolin-3-one, 10,10 oxibisphenoxiarsine, isothiazolines, zinc pyrithione, folpet (trichlormetil tio-phthalimide). Examples of biocidal compounds which are effective in the invention include those sold under the trademarks DENSIL™ S (2356 tetrachloro-4 (methyl sulphonyl) pyridine from Zeneca Ltd), SK-NOB-Z™ (Zirconium phosphate which contains silver, Sanai of Japan) and VANQUISH™ (n-butyl 1,2-benzisotiazoline, Zeneca Ltd).

From the above examples, it can be seen that no efficient and inexpensive method, is already available to enable the production of plastic articles with antimicrobial properties, especially fungistatic and bacteriostatic, producing no adverse side effects.

In view of the limitations and disadvantages of the additives with biological action in articles made from plastic resins, it is an object of the present invention to provide an additive with fungistatic and bacteriostatic activity for use in the manufacture of plastic articles.

It is another object of the present invention to exploit the biological, physical and chemical properties of metallic silver and zinc oxide in the preparation of an additive with bacteriostatic and fungistatic activity for use in the manufacture of plastic articles while not deteriorating the desired properties of the material.

It is still an object of the present invention to provide an additive comprising metallic silver and zinc oxide nanoparticles.

It is yet another object of the present invention to provide an additive with fungistatic and bacteriostatic activity in the form of pellets masterbatch, for easy handling and integration with the polymer to be used in the final application.

Still another object of the invention is to provide an additive that is effective when it is used in a proportion of between 0.01% and 0.5% on the total weight of the plastic formulation, depending on the type of polymer and its final application.

It is yet another object of the present invention to provides a fungistatic and bacteriostatic additive which does not migrate to the surface of finished plastic articles.

It is yet another object of the present invention to provide an additive that is not degraded by ultraviolet rays.

These and other objects of the invention will be apparent from the following description and accompanying figures.

BRIEF SUMMARY OF THE INVENTION

In the text that follows, some of the terms used have the meaning described below.

"masterbatch": a concentrate containing ingredients that produce specific desired performance benefits either in the manufacture of the product or in the final product itself.

"bacteriostatic": means a substance that prevents cell reproduction of bacteria and therefore their proliferation.

"fungistatic" is a substance that prevents or inhibits cellular reproduction of fungis.

The present invention relates to an additive having fungistatic and bacteriostatic activities for the preparation of plastic items, especially for items that have direct contact with substances to be ingested or which come into direct contact with the skin, for instance drinking water reservoirs, cleaning accessories as well as tools and equipment for personal use.

The additive is a concentrated masterbatch in pellet form, prepared starting from a mixture of concentrates of zinc oxide and silver oxide obtained from a paste of nanometric zinc oxide which is given a surface treatment to improve their properties for integration into the final compound and to prevent its degradation, as well as a paste of nanometric metallic silver.

Due to the characteristics acquired by the additive as a result of the manufacturing process, the additive may be incorporated directly and homogeneously to the plastic material to which it is added, ensuring the same activity across the exposed surface, and being integrated homogeneously in the polymer, the active agents (silver and zinc oxide) not being exhausted by migration to the surface, which extends the useful life of the item as to its bacteriostatic and fungistatic characteristics.

Due to the non migration of the particles it is sufficient to provide an article with an active surface containing said active compounds, making it possible to use plastics processing techniques in which the treated polymer occupies the outer layer or external surface of the article, with thickness of between 40 and 50 microns, thus being preferred processes of coextrusion, coinjection and rotomoulding for the production of articles.

The homogeneity in the integration of zinc oxide paste is ensured by a surface treatment of the nanoparticles with additives based on bifunctional a carbon hydrolyzable silane, for its affinity with a wide variety of inorganic substrates and its integration into a polymer carrier prior to mixing with a concentrate of nanometric metallic silver mixed with a thermoplastic polymer that acts as vehicle.

DETAILED DESCRIPTION OF THE INVENTION

The present invention refers to an additive with bacteriostatic and fungistatic activity containing nanoparticles of ZnO/Ag°, in presentation of masterbatch in the form of pellets, used in the manufacture of plastic-based resins such as polypropylene, polyethylene, vinyl polychloride, polystyrene, high impact polystyrene, polyurethanes, etc. and the process for preparing the same.

The additive of the invention is directed to the manufacture of polymer products requiring to offer antimicrobial activity, for instance automobile parts, textiles, home appliances, toilet items, storage and transportation of water, packaging, etc.

Figure 1:
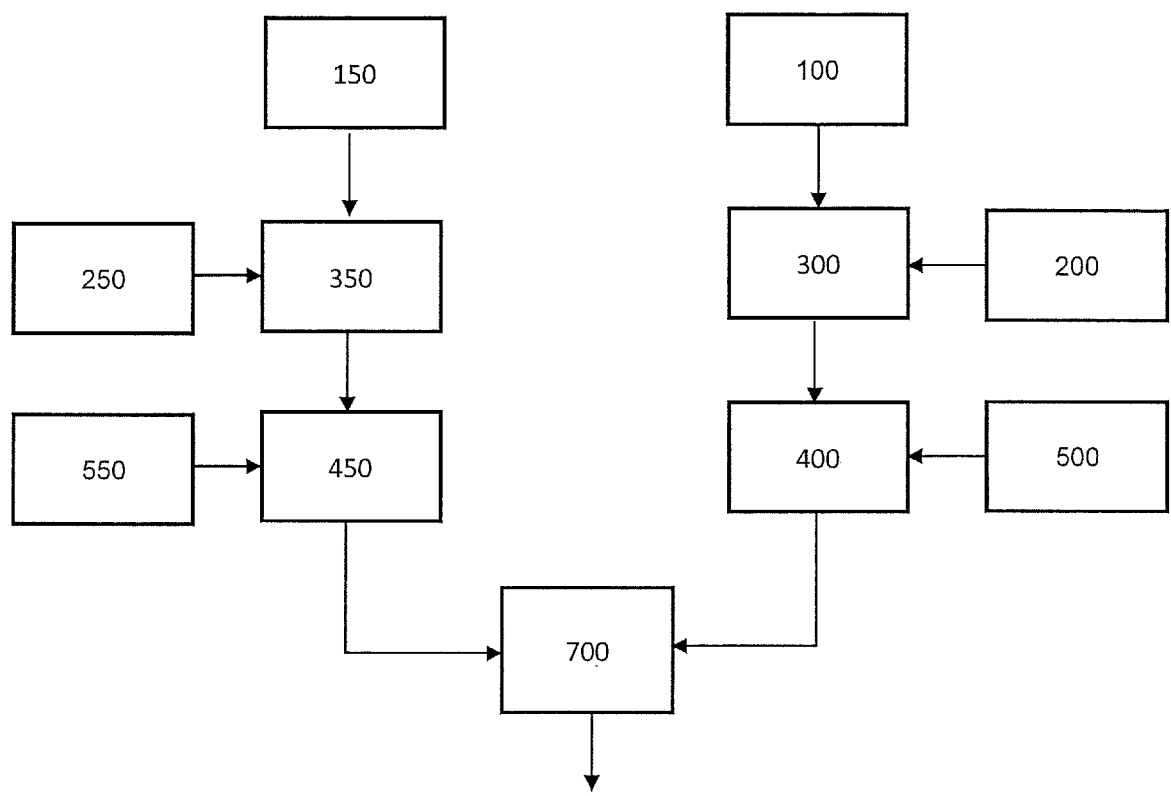
FIG. 1 is a block diagram showing the process for producing the additive which is the object of the invention.

In FIG. 1 the preferred production method for the fungistatic and bacteriostatic additive of the invention is shown, the method comprising the following process steps:

I. Preparation of a Concentrate of Zinc Oxide.
  1. To mix a paste of nanometric zinc oxide (100) coming from a surface treatment based in silanes, in a high intensity mixer (300) (for example, a mixer sold under the trademarks Draisswerke, Brabender, etc.) with the polymer or polymers which are compatible with the resin of the final application (200), until a 20% by weight concentrate of zinc oxide is obtained.
2. To mix the concentrate from the previous step to between 1 and 10% by weight, with a resin (500), of the same nature as that of the previous step in a twin screw extruder (400) (such as the type sold under the trademarks Brabender, Coperion, Werner & Pfleiderer, etc).

The mixing of step 2 with a resin compatible with the application to which the additive will be destined, permits said resin to act as a vehicle that can be easily integrated into the target resin and the percentage of concentrate added to the mixture should be such as to permit obtaining the desired ZnO:Ag° relation to incorporate into the final product.

II. Preparation of a Concentrate of Nanometric Metallic Silver.
3. To mix (350) a paste of nanometric metallic silver (150) with a thermoplastic polymer (250) that is compatible with the resin of the final application, to obtain a concentrate of 10% silver,
4. To mix (450) the resulting mixture in a twin screw extruder (for example, the type marketed under the Brabender, Coperion, Werner & Pfleiderer, etc. trademarks) with a resin (550) of the same nature as the resin of step above, until obtaining a paste with between 0.1 and 1% silver The mixing of step 2 with a resin compatible with the application to which the additive will be destined, permits said resin to act as a vehicle that can be easily integrated into the target resin and the percentage of concentrate added to the mixture should be such as to permit obtaining the desired ZnO:Ag° relation to incorporate into the final product.

III. Preparation of the Additive.
5. To nix the zinc oxide concentrate from step I with the silver concentrate resulting from step II, in a twin screw extruder (700) (for example, the type marketed under the Brabender, Coperion, Werner & Pfleiderer etc. trademarks), for obtaining the additive concentrate of ZnO/Ag° in masterbatch in pellet form.

To achieve the optimal effect of the additive of the invention, as to maximize the biological effect and to reduce the possible effects on the properties of the resins in the final article, it is important to control the raw material specifications and the conditions of the method. In the following the data reflecting the best performance of the additive are offered.

Raw Material

Table 1 shows the preferred ranges for the specifications for the ZnO paste to be used in preparing the additive of the invention.

TABLE 1

| Specifications for ZnO paste | | |
|---|---|---|
| Characteristic | Specification | Method |
| Purity (%) | 100 | DRx |
| Size of the particles | | |
| $D_{10}$ (micron) | 0.04-0.09 | Horiba |
| $D_{50}$ (micron) | 0.050-0.087 | Horiba |
| $D_{90}$ (micron) | 0.1-0.13 | Horiba |
| Solid contents (weight %) | 45-50 | Gravimetric |

Table 2 shows the preferred ranges for the specifications for the Ag° paste to be employed in preparing the additive of the invention, taking as an example the paste obtained from the method described in WO 2008/075933 patent application (Martinez et al, 2008).

TABLE 2

| Specifications for Ag° paste | | |
|---|---|---|
| Characteristic | Specification | Method |
| Purity (%) | 99-99.3 | Gravimetric |
| Size of the particles | | |
| $D_{10}$ nm | 41.5 | Coulter LS230 |
| $D_{50}$ nm | 47.0 | Coulter LS230 |
| $D_{90}$ nm | 56.0 | Coulter LS230 |
| Solid contents (weight %) | 80-85 | Gravimetric |

Examples are provided in the following for the preparation at laboratory scale of the additive of the invention.

Example 1

Preparation of Raw Material Concentrates

A. Preparation of the silver concentrate in low density polyethylene (LDPE). To prepare the silver concentrate an intensive mixing equipment for polymers is used.
  Step 1. Enter into the equipment 167 g of silver paste with 80% by weight of solids,
  Step 2. Add 1200 g of virgin LDPE resin to obtain a concentrate of about 10% by weight of silver,
  Step 3. Mix for 8 minutes ensuring the complete integration into the molten polymer,
  Step 4. Homogenize the material obtained by means of a twin screw extruder,
  Step 5. Check final concentration, which should be about 10% by weight.
B. Preparation of the ZnO concentrate in low density polyethylene (LDPE)

It is started from a paste of zinc oxide at 50% by weight solids with the above described specifications.

Once the dough is obtained its integration into the polymer is carried out in an equipment for intensive mixing of polymers, performing the following steps:
  Step 1. Introduce 600 g of paste of zinc oxide surface treated with silane additives into the chamber of the equipment,
  Step 2. Introduce 1200 g of LDPE resin,
  Step 3. Mix for 15 min to ensure good integration of the paste of zinc oxide nanoparticles with the virgin resin obtaining a concentrate of 20% zinc,
  Step 4. Homogenize the material by means of a twin screw extruder.

Example 2

Preparation of 5 kg of the Concentrate of ZnO/Ag° LDPE at 5% for a ZnO/Ag Ratio of 90:10 a. Mix 225 g of zinc oxide concentrate with 25 g of silver concentrate, prepared according to Example 1,
b. For a final application of 1 kg of LDPE, 40 g of the mixture from the previous step will be added, diluting with 960 g of LDPE for final application in a twin screw extruder for the additive ZnO/Ag° to be 0.2% by weight of the final mixture.

Example 3

Preparation of 5 kg of the Concentrate of ZnO/Ag° LDPE at 1% for a ZnO/Ag Ratio of 90:10 a. Mix 45 g of the zinc oxide concentrate with 5 g of silver concentrate, prepared according to Example 1,
b. For a final application of 1 kg at 0.05%, 50 g of concentrate will be added, diluting 950 g of the final compound for a final application in a twin screw extruder for the additive ZnO/Ag° to be at 0.05%.

It is to be noted that the above examples produce an additive in a ZnO/Ag° ratio of 90:10, which is the recommended ratio for best results in typical applications, however combinations up to 10:90 ZnO/Ag can be used passing through the intermediate ranges for different performances and applications.

The additive obtained according to the described method was tested on several polymers, in accordance with Examples 2 and 3, which were exposed to three bacterial strains and four fungal strains with the results shown below.

The additive obtained according to the described method was tested on several polymers, in accordance with Examples 2 and 3, which were exposed three bacterial strains and four fungal strains with the results shown below.

In Table 3 are shown in summary, the comparative results obtained in the assessment of the effects on microbial activity (Drop Test) for strains of *Staphylococcus aureus, Escherichia coli*, and fungi *Trichoderma viride, Aspergillus niger, Candida albicans* and *Mycosphaerella fijensis* in low density polyethylene (LDPE) for use in packaging.

Figure 2:
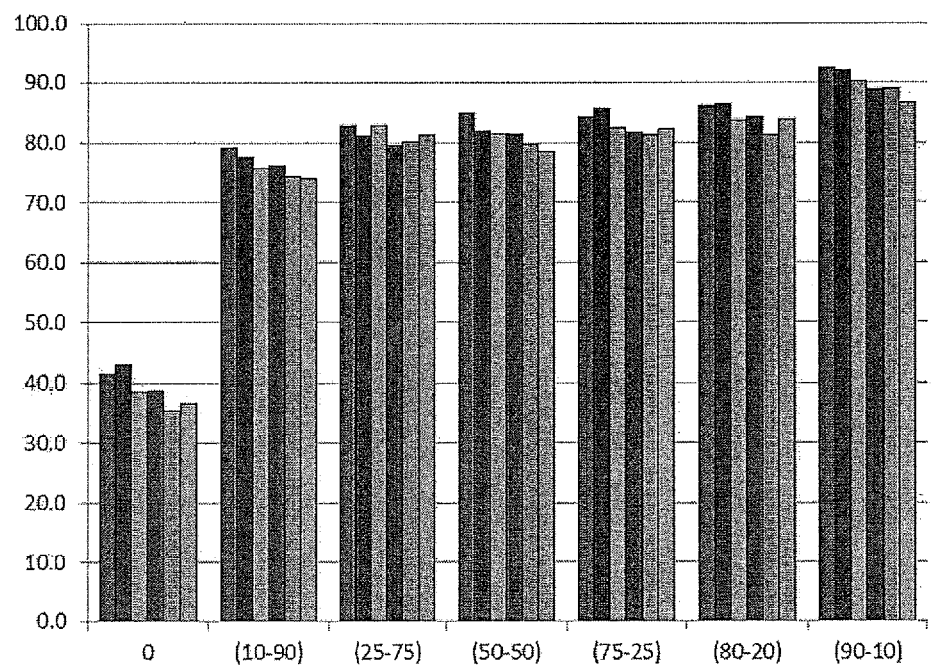
FIG. 2 is a graph showing the comparative results of microbial reduction for 6 strains of organisms, for variable concentrations of ZnO/silver additive.

FIG. 2 is a graph showing the comparative results of Table 3, for the percentage of microbial reduction in packaging of low density polyethylene (LDPE), on the vertical axis, where the first group of columns corresponds to LDPE without additive and the following six groups of columns refer to LDPE with 0.0 and 0.05% ZnO additive in relationships ZnO:Ag° from 10:90 to 90:10; the columns correspond, from left to right to *Staphylococcus aureus, Escherichia coli, Trichoderma viride, Aspergillus niger, Candida albicans* and *Mycosphaerella fijensis*.

TABLE 3

Effects of the use of the additive on the microbial activity in LDPE (Drop Test) for two strains of bacteria and four fungal strains at a concentration of 0.05% of the additive with different relationships ZnO:Ag°

| Relationship ZnO:Ag° | Microbial Reduction (%) | | | | | |
|---|---|---|---|---|---|---|
| | S. aereus | E. coli | T. viride | A. niger | C. albicans | M. fijensis |
| 0 | 41.5 | 42.9 | 36.5 | 38.7 | 35.4 | 36.6 |
| 10:90 | 79.1 | 77.6 | 75.8 | 76.1 | 74.3 | 74.0 |
| 25:75 | 83.0 | 81.1 | 82.9 | 79.5 | 60.2 | 81.4 |
| 50:50 | 84.8 | 82.0 | 81.6 | 81.5 | 79.7 | 78.5 |
| 75:25 | 84.2 | 85.7 | 82.6 | 61.7 | 61.3 | 82.4 |
| 80:20 | 86.1 | 86.4 | 83.7 | 84.2 | 81.3 | 83.8 |
| 90:10 | 92.5 | 92.1 | 90.3 | 88.9 | 89.1 | 66.7 |

It can be appreciated that the increased efficiency of the microbial reduction by the action of the additive is substantial for all strains. As to the increase in the ratio of ZnO in the relationship) (ZnO/Ag° a remarkable improvement in microbial reduction is observed, with the result that the 90/10 ratio ZnO/Ag° is where the highest microbial reduction is obtained, although the additive is effective even with the 10-90 ratio, compared to the reduction produced by the polymer alone.

In Table 4 is shown the effect of the content of the additive on the colour of the LDPE containers at different concentrations of ZnO/Ag°. The L* value refers to the colour settings for brightness ranging from zero (black colour) to 100 (white colour).

TABLE 4

Effect of additive concentration on the whiteness (L*) in containers with different contents ZnO/Ag°

| Relationship (ZnO/Ag) | Whiteness (L*) Concentration of additive (%) | | |
|---|---|---|---|
| | 0 | 0.025 | 0.05 |
| 75:25 | 84 | 84 | 85 |
| 80:20 | 85 | 85 | 86 |
| 90:10 | 85 | 87 | 88 |

Figure 3:
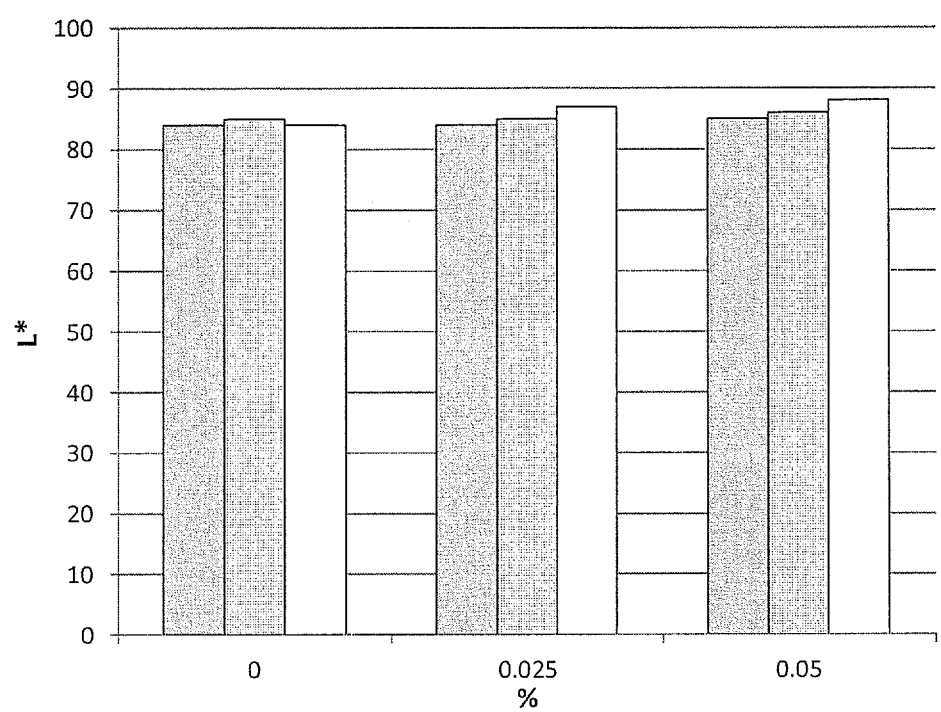
FIG. 3 is a graph showing the effect of the concentration of the additive on the whiteness (L*) in containers with different contents of ZnO/Ag°.

FIG. 3 is a graph showing these results. It can be seen that the increase in additive content from 0%, for the columns on the left, 0.025% for the central columns up to 0.05%, for the columns to the right, does not significantly affect the value L*, shown on the vertical axis, associated with the whiteness of the compound. It is also important to note that the colour is not affected by the presence of silver because of the low doses used and also by the change in the ZnO/Ag° relationship.

Tables 5 and 6 show comparative results on microbial activity, using two concentrations of the additive in various polymeric matrices, tested by the Test Drop method for three strains of bacteria (Table 5) and three strains of fungis (Table 6). The selected polymeric matrices for testing are as follows:

an EVA polymer produced by Dupont under the trade name Elvax 250®, a PATENT PROTECTION polymer marketed under the brand Indelpro®, a HIPS polymer marketed under the brand Resirene®

Additive concentrations are such that an efficiency is achieved in the microbial reduction of more than 90%.

TABLE 5

Effects of the use of the additive on microbial activity of three bacterial strains.

| Polymer | % additive in the final application | Bacterial strains for the test % Microbial Reduction | | |
|---|---|---|---|---|
| | | Escherichia Coli | Salmonella Choleraesius | Staphylococcus Aureus |
| EVA | 0.0 | 11.9 | 11.5 | 10.6 |
| | 0.1 | 91.2 | 90.7 | 92.8 |
| PP | 0.0 | 33.33 | 10 | 0 |
| | 0.1 | 99.86 | 99.4 | 99.5 |
| HIPS | 0.0 | 81.8 | 79.6 | 78.7 |
| | 0.5 | 99.4 | 96.6 | 96.5 |

From the table is also evident that the effect of the additive is significant in low concentrations, although the effectiveness depends, as is well known, on the nature of the polymer in which it is applied.

TABLE 6

Effects of the use of the additive on microbial activity for three strains of fungi.

| Polymer | % additive in the final application | Bacterial strains for the test % Microbial Reduction | | |
|---|---|---|---|---|
| | | Trichoderma Viride | Aspergillus Niger | Mycosphaerella Fijiensis |
| EVA | 0.0 | 11.2 | 10.4 | 10.7 |
| | 0.1 | 92 | 90.3 | 90.1 |
| PP | 0.0 | 50 | 0 | 0 |
| | 0.1 | 97.5 | 97 | 70 |
| HIPS | 0.0 | 79.1 | 78.6 | 79 |
| | 0.5 | 95.3 | 93.2 | 93.7 |

Figure 4:
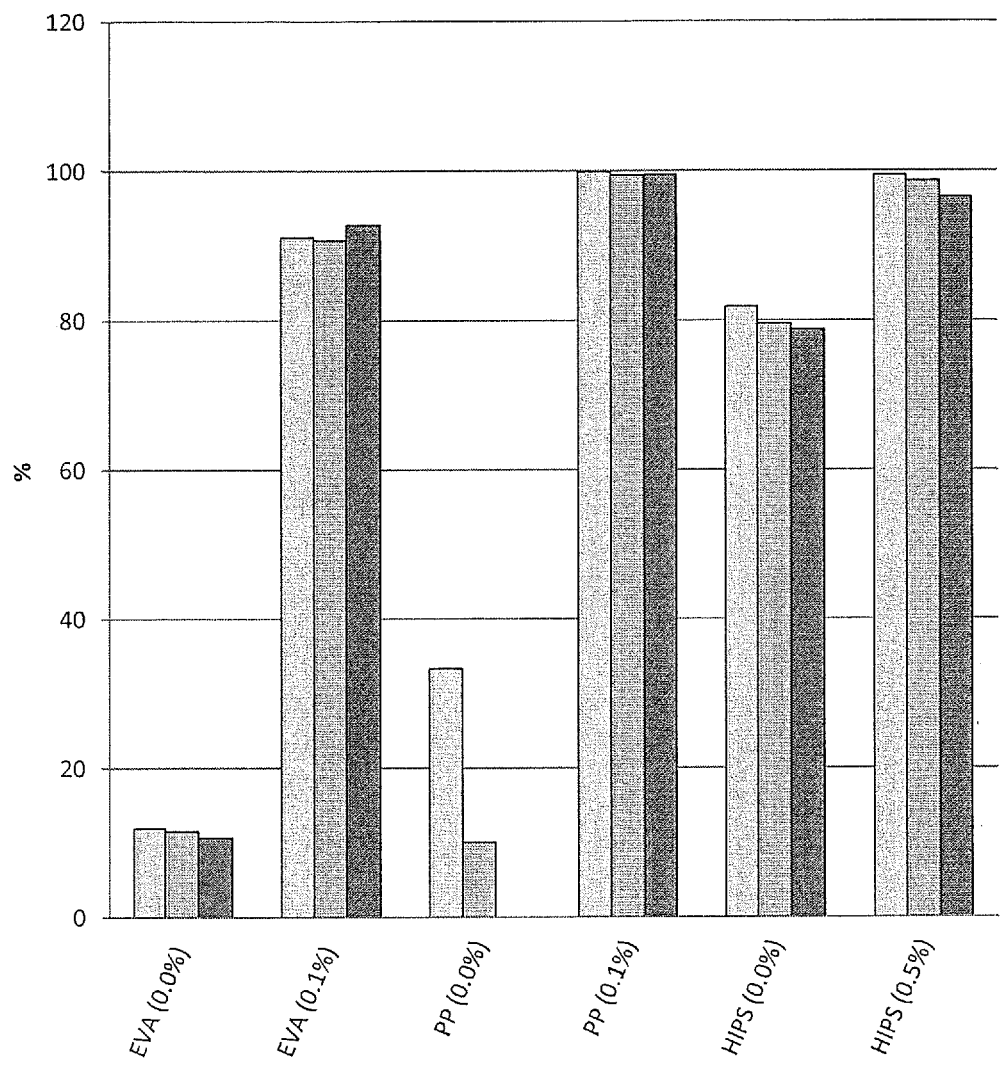
FIG. 4 shows the comparative results using the additive at concentrations of 0.0, 0.1 and 0.5%, in different polymer matrices on microbial activity for three strains of bacteria.
Figure 5:
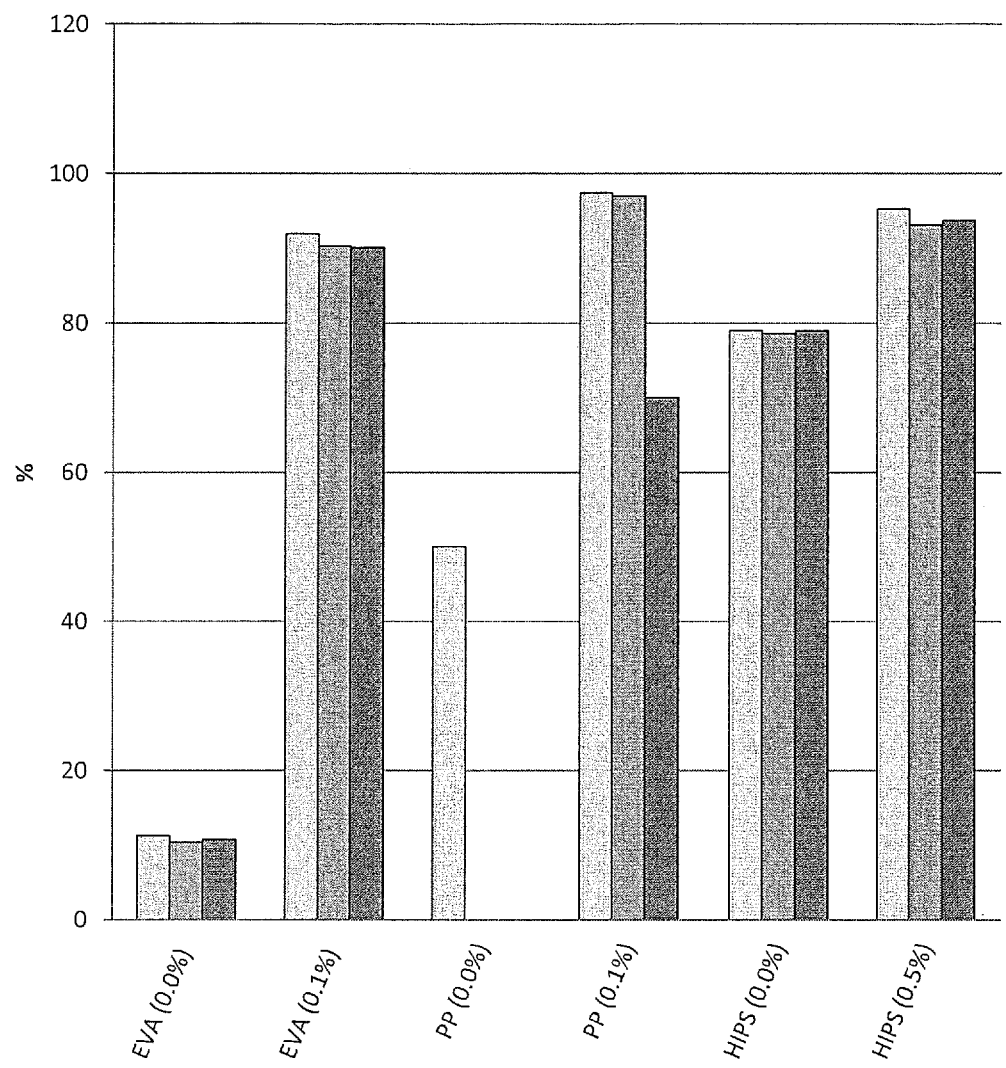
FIG. 5 shows the comparative results using the additive at concentrations of 0.0, 0.1 and 0.5%, in different polymer matrices on microbial activity for two strains of fungi.

FIGS. 4 and 5 are graphical representations of the results shown in Tables 5 and 6, respectively, the vertical axis showing the percentage of microbial reduction and the horizontal axis showing the percentages of additive employed for each polymer evaluated, showing FIG. 4, groups of three columns for *E. coli*, *S. choleraesuis* and *S. aureus*, from left to right, and in FIG. 5 *T., viride, A. niger* and *M. fijiensis*, respectively, making it easier to appreciate the difference in microbial reduction.

Table 7 shows the effects of using the additive at different concentrations (0.15 and 0.3%) of 340 RP polypropylene before and after aging in UV chamber, before aging for *E. coli* and after aging, for *S. aureus*.

TABLE 7

Effects of the use of the additive in RP 340 polypropylene copolymer before and after aging

| Sample | Before aging Inhibition %. | After 120 h of aging Inhibition %. |
|---|---|---|
| PP compound | — | — |
| Compound with Triclosan | 98.40% | 88.06% |
| PP compound with 0.15% additive | 97.30% | 93.28% |
| PP oompound with 0.3% additive | 99.20% | 95.52% |

Figure 6:
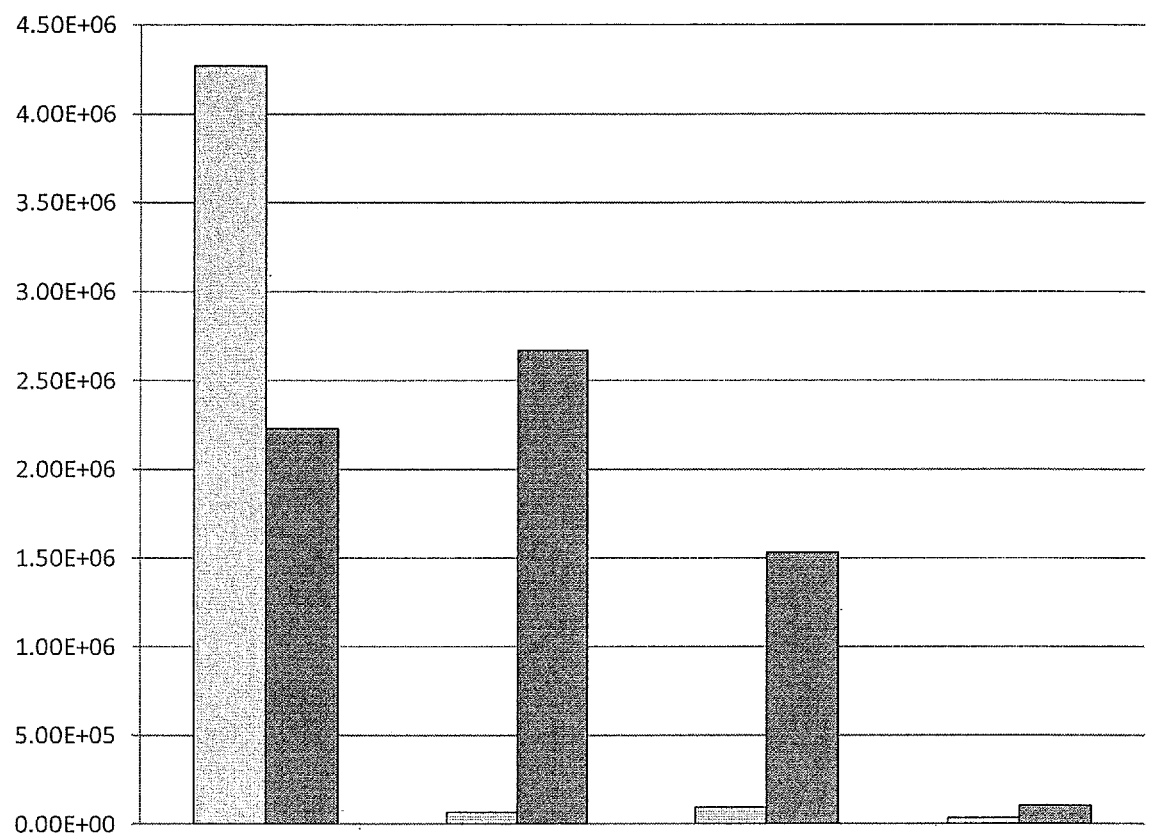
FIG. 6 shows the effects of using the additive in polypropylene copolymer at concentrations of 0.15 and 0.3% before and after aging in an UV chamber.

FIG. 6 graphically shows the difference in the count of bacterial colonies, vertical axis, before and after aging (left and right columns respectively in each pair of columns) as well as the effect of the additive and the variation in the concentration. As can be seen in the table, considering the groups of sorted columns from left to right for the compound alone, the compound with triclosan, the compound with 0.15% of additive and the compound with 0.3% of additive, respectively, both the organic compound (triclosan) and the inorganic compound based on Zn/Ag° are highly efficient at inhibiting the growth of microorganisms with greater than 97% inhibition rates. However, the antimicrobial compound with the organic type additive (triclosan) starts decreasing its antimicrobial effectiveness as aging time reaches 120 h, while the additive of inorganic nature Zn/Ag° remains active even after 120 h, this being due to the fact that the additive ZnO/Ag° is not consumed and does not migrate to the surface, but remains anchored to the polymer matrix and starts acting as the material wears out.

After the discussions of these results it is to be concluded that some of the effects and/or advantages of using the additive of the invention are as follows:

it is a masterbatch additive in the form of pellets whose presentation makes it easily manageable during processing and application, it is compatible with a wide range of thermoplastic resins and "commodities" resins which are commonly used in the market for various applications, it can be used in various methods of plastics processing, either extrusion, injection, blow molding, thermoforming, cast film, etc.

it is highly efficient in controlling colonies of bacteria and fungi commonly found in nature, it is possible to achieve high rates of microbial inhibition at very low concentrations of additive in the final application starting from 0.05% and it is not required to exceed 0.5% by weight of the polymer-additive mixture, the effect of migration of the active compounds is removed, producing a lasting effect, beyond that expected for additives with similar action, for example, organic-based additives, photocatalytic reactions are prevented and therefore the premature degradation of the polymer due to its surface treatment in avoided, also facilitating its dispersibility and easy integration into the polymer into which it is to be applied, it does not have negative effects on the polymer properties, especially the colour of the polymer is not affected due to the presence of silver due to the low doses in which it is used, it is recyclable and its antimicrobial effect is not affected by reprocessing cycles and/or recycling.

From the foregoing description and examples, it is evident that the additive of the invention offers important advantages with respect to other additives conventionally employed in particular providing greater effectiveness in controlling fungi and bacteria, while maintaining without negative effects other properties of the target material; to one skilled in the art it will be apparent that the proportions of ZnO/Ag° in the final resin mixture shown in the examples are not limiting and are only intended to show a comparison of the effect of the presence of active elements as to its bacteriostatic and fungistatic activity and non damaging effects for other properties, so that such proportions can and should be adjusted to said target material, however, the method for preparing the additive is such that ensures dispersibility and permits better control of the amount of each of the active compounds in the final mix.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

We claim:

1. A method for production of a fungistatic and/or bacteriostatic additive concentrate configured for homogeneous incorporation in plastic articles when added directly thereto, the method comprises the following steps:
   a) preparing a zinc oxide concentrate comprising:
      i) mixing a paste of nanometric zinc oxide pretreated with silane-based additives, with one or more polymers compatible with a resin to be used in the article, thereby obtaining a concentrate with 20% by weight of zinc oxide; and
      ii) mixing the concentrate of step a) i) with the resin to be used in the article until a concentration between 1 and 10% by weight of zinc oxide is obtained;
   b) preparing a silver concentrate comprising:
      i) mixing a silver paste of nanometric metallic silver with a thermoplastic polymer compatible with the resin to be used in the article, thereby obtaining a concentrate with 10% by weight of silver; and ii) mixing the concentrate of step b) i) with the resin to be used in the article until a concentration between 0.1 and 1% by weight of silver is obtained; and c) mixing the zinc oxide concentrate of a) and the silver concentrate of b) to obtain the fungistatic and/or bacteriostatic additive concentrate, wherein the additive concentrate has a ratio of $ZnO:Ag°$ ranging from 10:90 to 90:10;

wherein maximum particle size of the nanometric zinc oxide and nanometric metallic silver is less than 500 nm;

wherein the fungistatic and/or bacteriostatic additive concentrate is a masterbatch in pellet form; and wherein the fungistatic and/or bacteriostatic additive concentrate has an effective concentration of 0.01 to 0.5% by weight of the total formulation when included within the plastic articles and is configured for homogeneous incorporation therein without affecting coloration of the plastic articles.

2. The method of claim 1, wherein the mixtures are performed in a twin screw extruder to form pellets.

3. The method of claim 1, wherein the nanometric zinc oxide has 45-50 wt % of solids content and the nanometric silver has 80-85 wt % of solids content.

* * * * *